J. H. THRELKELD.
AUTOMATIC STOCK AND POULTRY FOUNTAIN.
APPLICATION FILED SEPT. 10, 1913.
1,102,176.
Patented June 30, 1914.
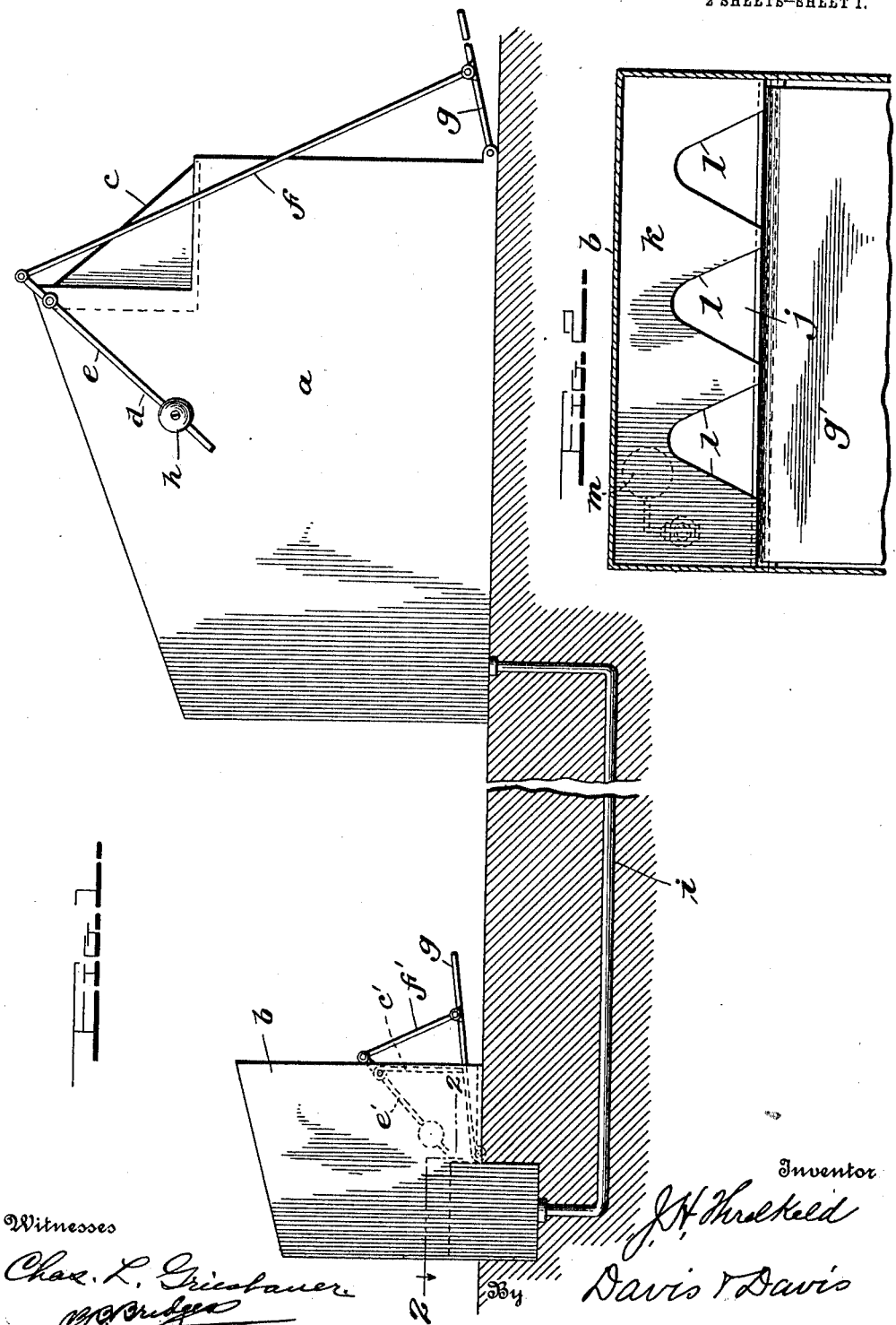

J. H. THRELKELD.
AUTOMATIC STOCK AND POULTRY FOUNTAIN.
APPLICATION FILED SEPT. 10, 1913.
1,102,176.
Patented June 30, 1914.
2 SHEETS—SHEET 2.
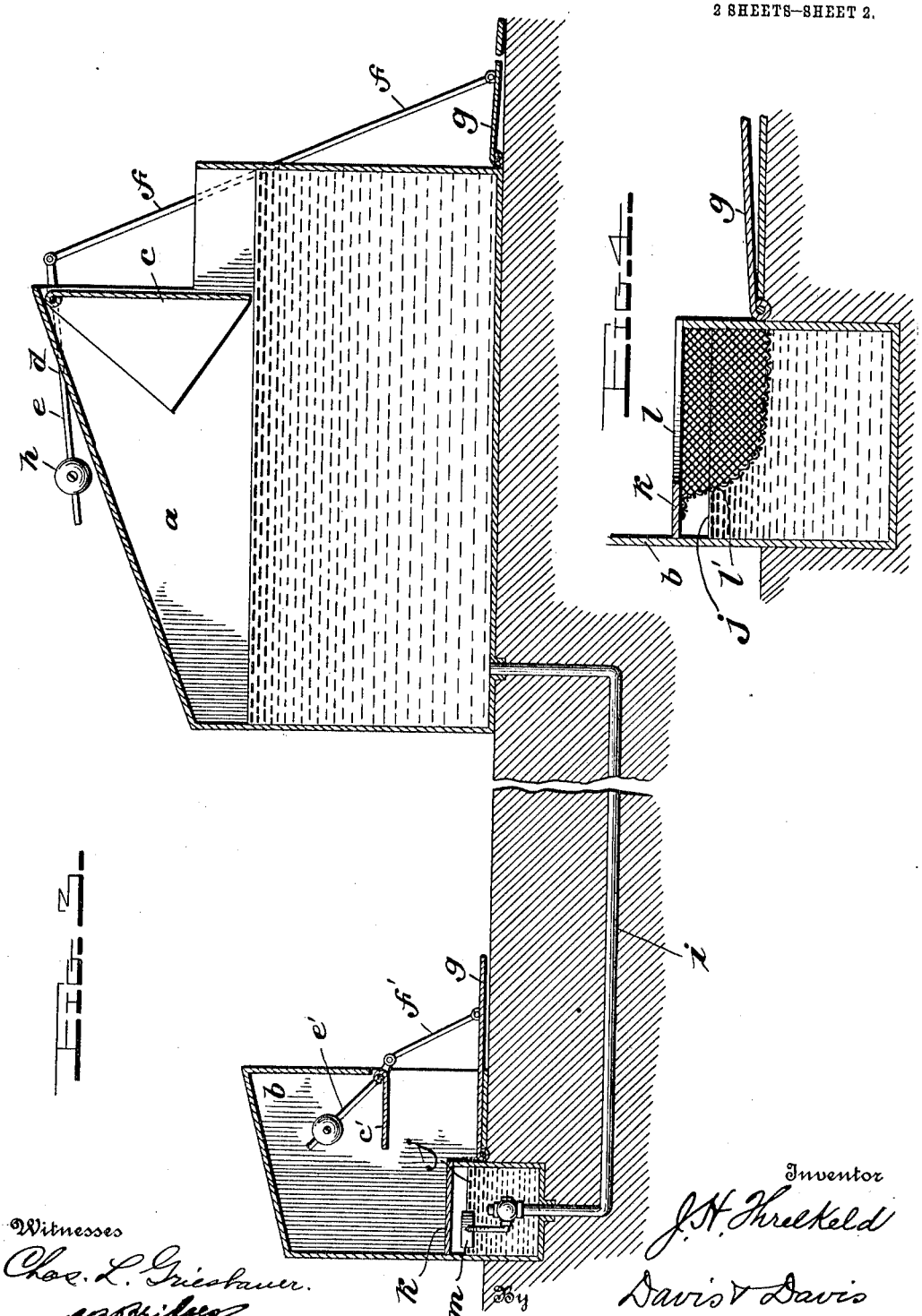

UNITED STATES PATENT OFFICE.

JOHN H. THRELKELD, OF CHARITON, IOWA.

AUTOMATIC STOCK AND POULTRY FOUNTAIN.

1,102,176.

Specification of Letters Patent. Patented June 30, 1914.

Application filed September 10, 1913. Serial No. 789,129.

*To all whom it may concern:*

Be it known that I, JOHN H. THRELKELD, a citizen of the United States, and a resident of Chariton, county of Lucas, State of Iowa, have invented certain new and useful Improvements in Automatic Stock and Poultry Fountains, of which the following is a full and clear specification, reference being had to the accompanying drawings, in which—

Figure 1 is a side elevation; Fig. 2, a horizontal section on the line 2—2 of Fig. 1; and Fig. 3 is a vertical longitudinal section of my improved apparatus; Fig. 4 is a detail view of a part of by apparatus.

The object of this invention is to provide a drinking fountain or trough for the use of stock and poultry, the chief feature of the invention consisting of a cover or lid which will, by the weight of the animal, be caused to open when the animal approaches the fountain to obtain a drink, as more fully hereinafter set forth.

In the drawings $a$ designates a main tank which is adapted to be used by horses and cattle and $b$ designates a smaller auxiliary fountain or tank adapted to be used by hogs, sheep and poultry. The tank $a$ may be kept replenished with water and the level maintained in the tank by any suitable means. This tank $a$ is covered except at its upper front corner, and at this point is swung on horizontal pivots a lid $c$, which is kept normally closed by a counter-weight $d$ carried by a rod $e$, which is fixed to one of the pivots of the lid. The lid depends from its pivots toward the surface of the water and it inclines downwardly and forwardly to the upper front edge of the tank. The arm $e$ is extended beyond the pivot a short distance and is pivotally connected to rod $f$, and this rod is pivotally connected at its lower end to a platform $g$ which is in turn pivoted at a point near the tank and extends upwardly therefrom, so as to lie in a position where it must be trodden upon as the animal approaches the front edge of the tank to obtain a drink. With this construction, it will be observed that when the animal treads upon the platform $g$, the lid $c$ will be swung inwardly far enough to uncover the surface of the water in the tank along the front edge of the tank, and the lid will be held back out of the way so long as the animal depresses the platform $g$. When the animal steps back off of the platform, the counter-weight will swing the lid, as well as the platform, back to normal position. It will be observed that the counter-weight may be arranged to just nicely overbalance the platform and the lid, so that it will require but a light pressure upon the platform to swing the lid back out of the way. It will be observed that a feature of importance lies in the arrangement whereby the lid will be swung backwardly away from the nose of the approaching animal, so that there can never be any danger of the lid striking the animal while it is in the act of opening. With this construction, it will be seen that the water in the tank will be protected completely and thus be kept fresh and clean. By making the counter-weight adjustable on its arm by means of a screw $h$, this weight may be adjusted from time to time to nicely balance the lid, and thus permit it to be readily opened as well as to cause it to close without shock or jar.

The main tank is connected to the auxiliary tank by a pipe $i$, which is buried in the ground sufficiently deep to prevent freezing. The tank $b$ is provided at its rear with a water-holding trough $j$, whose top $k$ is provided with one or more openings $l$ to permit the insertion of the heads of sheep, hogs and poultry. The supply pipe $i$ enters this trough $j$ and is provided with a suitable float or other automatic valve $m$ to maintain a predetermined level of water in this tank $j$.

As will be seen, the trough $j$ is suitably housed, and the front wall of this housing is provided with a depending door $c'$ which is adapted to operate in the same manner as the lid $c$ of the stock tank. To accomplish this, one of the pivots of this door $c'$ is attached to a counter-weighted arm $e'$ which arm is connected by a link $f'$ to a pivoted platform $g'$, this platform $g'$ being extended into the housing and being pivoted at a point near the front wall of the trough $j$. The proportions of these parts should be such that the fowl or animal will be able to reach the water in the tank $j$ without entirely entering the housing. Should the water depth in the auxiliary tank be sufficient to drown young pigs that might fall into the same through the openings $l$, I may provide means for catching and holding them to prevent drowning; I have shown one such device in Fig. 4, which consists simply of a wire mesh cage $l'$ fastened to the top of the tank, and depending a few inches below the normal level of the water.

As before stated, the counter-weight nicely over-balances the platform and the lid, it being understood that "nicely over-balance" means, to just sufficiently over-balance to assure the closing of the lid without slamming, thus avoiding the use of locking means for retaining the lid in a closed position. Furthermore, the particular arrangement of the lid is important, in that, the lid falls from an inclined position to a vertical position when opening, and in the vertical position, it forms a vertical wall which prevents the animals from inserting their heads too far within the housing. The vertical wall formed when the lid is opened, is retained in that position as long as an animal is standing upon the operating platform, thus forming an abutment which cannot be dislodged until the weight upon the platform is removed.

I make no claim herein to the specific structure of the auxiliary fountain or tank and its door-operating mechanism, as the same forms the subject matter of a co-pending application Serial No. 841,277, filed May 27, 1914.

Having thus described my invention, what I claim is—

A drinking fountain of the class set forth, comprising a covered tank having an opening at its upper front corner, a downwardly and forwardly inclined pivoted lid for closing said opening, a counter-balancing means for normally balancing said lid in an inclined closed position, and means operable by the weight of an animal in drinking position and located in front of the tank for lifting said counter-balancing means and swinging said lid backwardly to a vertical position and retaining it in said vertical position while the animal is drinking.

In testimony whereof I hereunto affix my signature in the presence of two witnesses.

JOHN H. THRELKELD.

Witnesses:
J. D. THRELKELD,
C. A. HOWARD.

---

Copies of this patent may be obtained for five cents each, by addressing the "Commissioner of Patents, Washington, D. C."